UNITED STATES PATENT OFFICE.

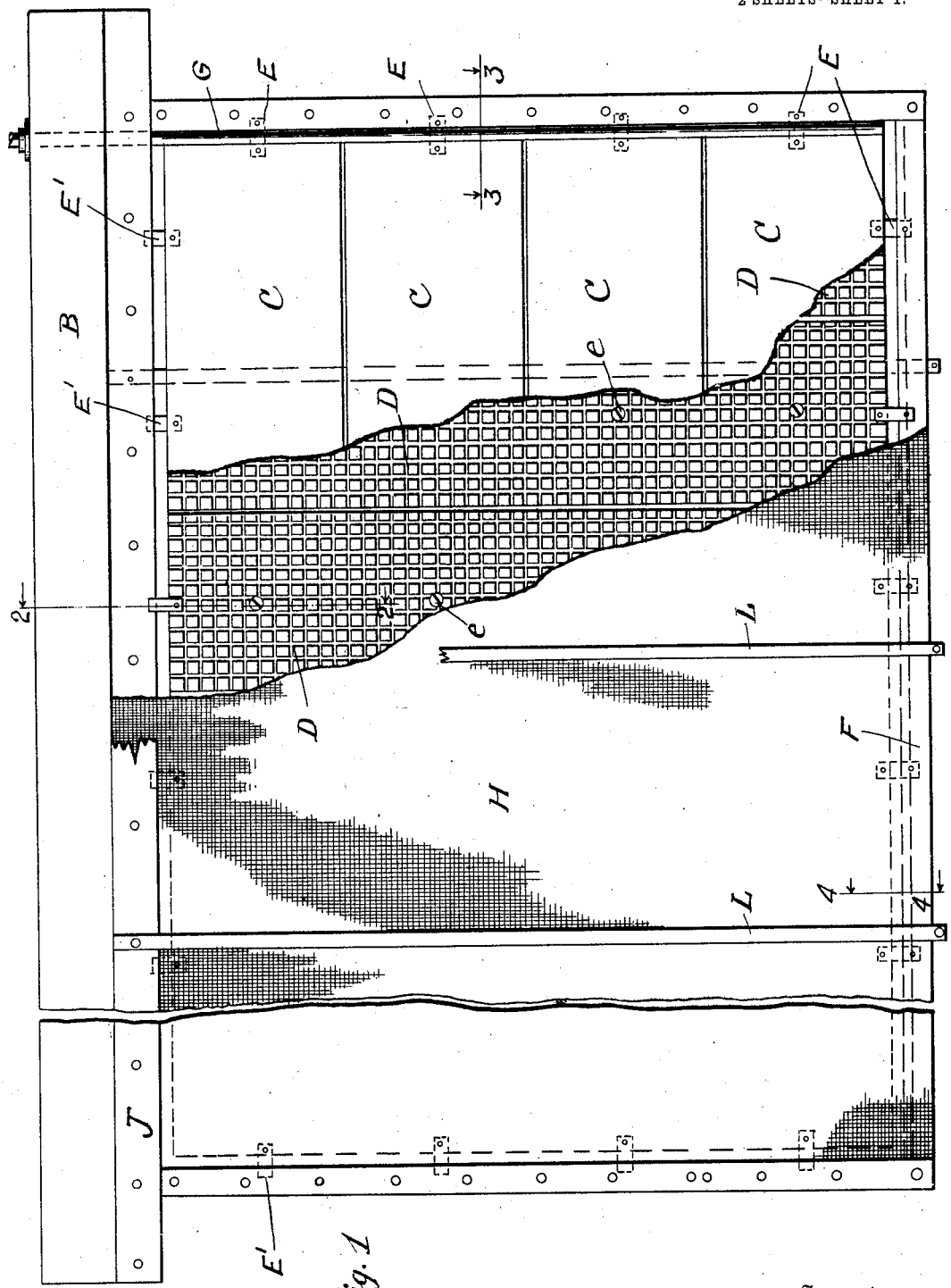

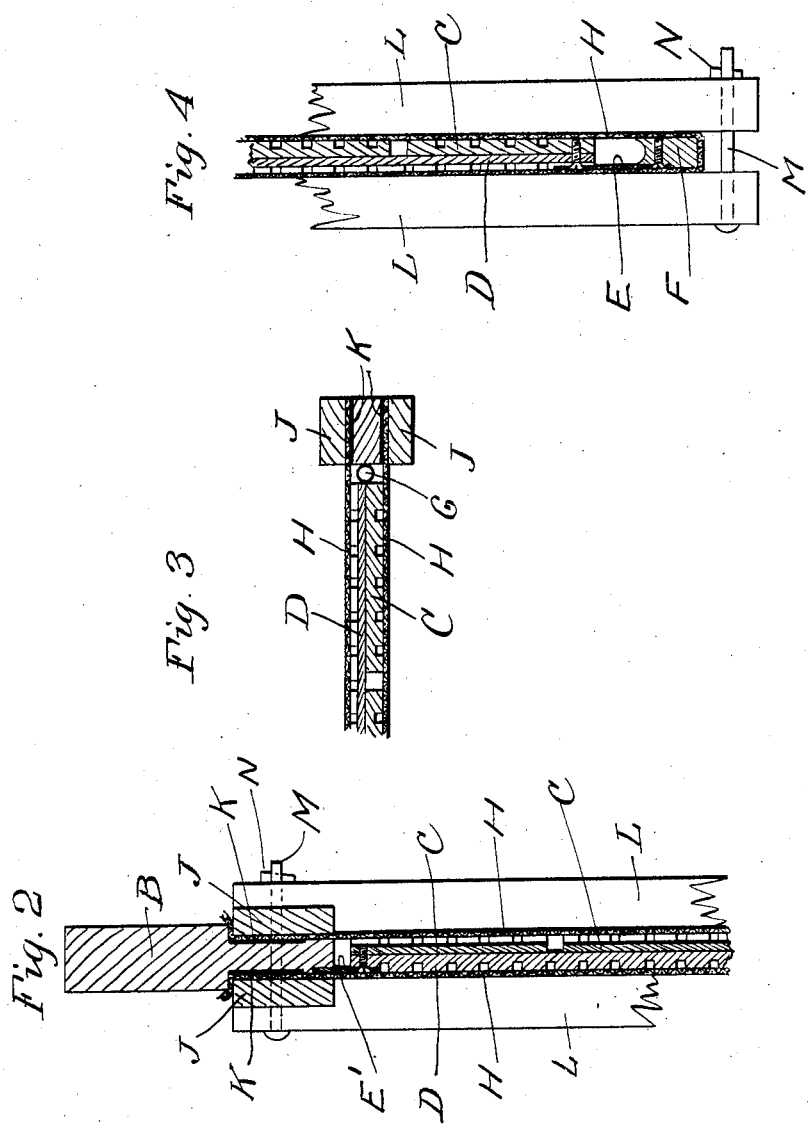

GALEN HOWELL CLEVENGER, OF PALO ALTO, CALIFORNIA, ASSIGNOR TO THE BUTTERS PATENT VACUUM FILTER COMPANY, INC., A CORPORATION OF NEVADA.

FILTER-FRAME.

No. 896,436.  Specification of Letters Patent.  Patented Aug. 18, 1908.

Application filed October 30, 1907. Serial No. 399,929.

*To all whom it may concern:*

Be it known that I, GALEN HOWELL CLEVENGER, a citizen of the United States, and resident of Palo Alto, California, have invented certain new and useful Improvements in Filter-Frames, of which the following is a specification, accompanied by drawings.

The invention is designed particularly for suction or pressure filtering systems, but the invention is not limited to filters for use in such systems.

The object of the invention is to simplify the construction of the filter and particularly to provide means for the prevention of the accumulation within the filter of any sediment which may pass through the filter cloth.

Certain other objects will also be apparent in connection with the detailed description of the device.

In the accompanying drawings, Figure 1 is a face view partly broken away to show the interior construction; Fig. 2 is an enlarged cross section on the line 2—2 of Fig. 1; Fig. 3 is an enlarged cross section on the line 3—3 of Fig. 1; and Fig. 4 is an enlarged cross section on the lines 4—4 of Fig. 1.

In its preferred form the invention provides a filter frame having a filler plate or backing for the filter cloth, this filler plate or backing having its outer surfaces provided with interconnecting grooves. The filtrate passing through the filter cloth is thus afforded a free exit by straight channels so that any solid material that passes the filter cloth, passes out with the solution instead of lodging in the interior of the filter. This filler plate or backing is built up of boards firmly screwed together, these boards running longitudinally on one side of the filler plate and transversely on the other side. With this arrangement any swelling or warping of the wood is provided against, and an exceedingly strong and light construction results.

Referring to Fig. 1, B is the upper member of a rectangular frame, within which is mounted the filler plate or backing before referred to. As will be seen from the drawing, a series of boards C are secured by screws e to a series of transversely arranged boards D. Both sets of boards C and D are provided with longitudinal and transverse grooves on their outer surfaces. Between the boards of the several sets is left a space to provide for the further swelling of the frame when it becomes wet. This filler plate made up of cross strips or boards is suspended or supported in the following manner: Secured to the frame at one end and to the filler plate at the other end are a series of lugs E mortised in flush with the surface of both the filler plate and the frame. At the bottom and one side of the frame these lugs E are fastened to both the filler plate and the frame. At the other side and top, similar lugs E′ are fastened only at one end to the filler plate as shown in cross-section in Fig. 2. By this arrangement the filler plate is free to expand at one side and at the top, and this provides for any inequality of swelling of the filler plate and the frame. After the filler plate is mounted in position within the frame, a space is left between all sides of the filler plate and the frame.

The bottom piece F of the frame is provided with a groove, and this groove together with the space which is left between the bottom of the filler plate and the frame, serves as a passageway for the solution that drains from the surface of the filler plate. The space at one side between the filler plate and the frame serves as a passageway for the pipe G, which is connected to the suction apparatus (not shown). The usual canvas filtering medium H, (cut away in Fig. 1 to show the filler plate behind it) is attached to the frame, by battens J, a strip of blanket covered with tar being inserted between the canvas and the frame at the top and sides as shown at K (Figs. 2 and 3). The battens are secured in place by headed bolts M having at their outer ends longitudinal slots, through which wedges or cotters N are driven, the same means of fastening being used to secure the cleats L. These cleats L are mounted as shown for the purpose of sustaining the canvas when a reverse current of wash water or other fluid under pressure is forced into the inside of the filter to wash off deposits. The pipe G passes through the top member of the frame B and is secured to an apertured and threaded plate on the top of the frame.

In the operation of the device it will be seen that during the filtering operation, whether this be produced by suction from the inside or pressure from the outside, the canvas H is pressed against and supported by the grooved interior filling plate, the grooves in the filler plate allowing the filtrate and any sediment which may pass through the meshes of the canvas to be carried off through the straight grooves and out through the pipe G. When pressure is applied to the interior of the filter frame, the cleats restrain and support the canvas so that it cannot be blown out, torn or burst open. For this reason the cleats may be placed at frequent intervals. When it is desired to open the filter for the purposes of cleaning it, the wedges can be readily driven out of the ends of the bolts and the canvas removed, thereby affording free access to the surfaces of the filler plate. This filler plate can, of course, be readily removed from the frame by unbolting the frame.

While I have described this filler plate as made of wood, it may be made of any other suitable material. It will also be apparent that by removing the battens and cleats, the filter cloth can be taken off, cleaned as a whole, and easily replaced.

I claim and desire to obtain by Letters Patent the following:

1. A filler plate for a filter frame made up of spaced strips crossed and secured together and having inter-connecting grooves on their outer surfaces.

2. A filler plate for a filter frame made up of spaced wooden strips crossed and secured together, and having inter-connecting grooves on their outer surfaces.

3. A filter frame having a filler plate of expansible material slidably secured thereon, and adjustable in the frame in the plane of said plate.

4. A filter frame having a filler plate rigidly secured at one side and bottom and slidably secured at the other side and the top.

5. A filter frame comprising a frame, a filler plate within the frame having transverse and longitudinal interconnecting grooves on its outer surface, a filtering medium surrounding the filler plate, and means for detachably securing the filtering medium to the top and ends of the frame.

6. A frame, a filler plate spaced therefrom, lugs secured to the plate and frame, and located at the bottom and one side, and lugs, secured to the plate and slidably engaging the frame at the top and other side.

7. A filter frame, a filler plate within the frame composed of crossed strips of wood having interconnecting grooves on their outer surfaces, lugs secured to the plate for expansibly securing the plate to the frame, a filtering medium, and means for detachably securing the medium to the frame.

8. A filter frame, a filler plate within the frame composed of crossed strips of wood having interconnecting grooves on their outer surfaces, lugs secured to the plate for expansibly securing the plate to the frame, a filtering medium, means for detachably securing the medium to the frame, and a pipe passing into the interior of the frame.

9. A filter frame, a filler plate within the frame composed of crossed strips of wood secured together and having inter-connecting grooves on their outer surfaces, lugs rigidly securing the plate to the frame at one side and the bottom, and lugs secured to the plate and slidably engaging the frame at the top and other side, a filtering medium detachably secured to the frame, and a pipe passing into the interior of the frame.

In testimony whereof I have signed this specification in the presence of two subscribing witnesses.

GALEN HOWELL CLEVENGER.

Witnesses:
ED. D. LACHMAN,
CLAYTON BELKNAP.